(12) United States Patent
Frederick et al.

(10) Patent No.: US 10,569,721 B2
(45) Date of Patent: Feb. 25, 2020

(54) AUTONOMOUS RADAR ROOF MODULE

(71) Applicant: TOYOTA MOTOR ENGINEERING & MANUFACTURING NORTH AMERICA, INC., Erlanger, KY (US)

(72) Inventors: Scott L. Frederick, Brighton, MI (US); Andrew L. Sakowski, Northville, MI (US); Bill Castleman, Canton, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/862,178

(22) Filed: Jan. 4, 2018

(65) Prior Publication Data
US 2019/0202371 A1 Jul. 4, 2019

(51) Int. Cl.
| | | |
|---|---|---|
| *B60R 11/04* | (2006.01) | |
| *B62D 25/06* | (2006.01) | |
| *G05D 1/02* | (2020.01) | |
| *B62D 35/00* | (2006.01) | |
| *B60J 7/043* | (2006.01) | |
| *G01S 13/931* | (2020.01) | |
| *G01S 13/91* | (2006.01) | |
| *B60R 11/00* | (2006.01) | |

(52) U.S. Cl.
CPC .............. *B60R 11/04* (2013.01); *B60J 7/043* (2013.01); *B62D 25/06* (2013.01); *B62D 35/00* (2013.01); *G01S 13/931* (2013.01); *G05D 1/0231* (2013.01); *G05D 1/0257* (2013.01); *B60R 2011/004* (2013.01); *B60R 2011/0042* (2013.01)

(58) Field of Classification Search
CPC .......... G01S 13/931; G01S 2013/9371; G01S 2013/9382; G05D 1/0231; G05D 1/0246; G05D 1/0248; G05D 1/0251; G05D 1/0253; G05D 1/0257; G05D 1/0278; B60R 11/04
USPC .............................................. 296/215, 216.01
See application file for complete search history.

(56) References Cited

U.S. PATENT DOCUMENTS

| | | | |
|---|---|---|---|
| 7,063,379 | B2 | 6/2006 | Steuer et al. |
| 9,625,582 | B2 | 4/2017 | Gruver et al. |
| 9,731,771 | B2 | 8/2017 | Sakabe et al. |
| 2017/0190300 | A1 | 7/2017 | Maranville et al. |
| 2017/0261273 | A1 | 9/2017 | Maranville et al. |
| 2018/0015886 | A1* | 1/2018 | Frank ................ B60R 11/04 |
| 2019/0003895 | A1* | 1/2019 | Krishnan ............ G01S 13/931 |

FOREIGN PATENT DOCUMENTS

| | | |
|---|---|---|
| DE | 10 2016 008 064 A1 | 12/2013 |
| JP | 2012-232679 A | 11/2012 |

* cited by examiner

*Primary Examiner* — Dennis H Pedder
(74) *Attorney, Agent, or Firm* — Oblon, McClelland, Maier & Neustadt, L.L.P.

(57) ABSTRACT

A roof apparatus for an autonomous hardtop vehicle is described. The apparatus includes a vehicle roof having an opening for a sunroof and a roof cover that encloses sensor devices. The roof apparatus is mounted from the underside of the vehicle roof at the position for mounting a sunroof. The sensors include an array of cameras having a field of view of the full width of the vehicle in at least the front of the vehicle. The height of the roof cover above the vehicle roof is a minimal height to accommodate the height of the cameras.

14 Claims, 4 Drawing Sheets

AUTONOMOUS RADAR ROOF MODULE

BACKGROUND

Autonomous vehicles, also known as a driverless car, self-driving car, robotic car, and unmanned ground vehicle are controlled by way of sensory techniques. Sensory techniques utilize various sensors to sense the environment so that the vehicle can navigate without human input. Sensory techniques can include radar, laser light, GPS, odometry, and computer vision. Sensor used in these techniques may include an array of devices mounted on the roof of the vehicle.

For example, FIG. 4 shows a sedan type car 401 with an array of sensor devices 403 mounted on racks attached to the roof area. The types of sensor devices may include one or more cameras to cover a 360 degree view around the vehicle. Another type of sensor device is referred to as a LIDAR, which is a radar device that uses laser light. LIDAR can be used to make a 3D representation of the area surrounding a vehicle. Thus, sensor devices mounted on vehicles may require unobstructed views over the peripheral of the vehicle.

However, the conventional rack arrangement exposes the various sensor devices to various environmental conditions, causes aerodynamic drag, and is unappealing.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates a roof apparatus for an autonomous hardtop vehicle.

The roof apparatus includes a vehicle roof having an opening; a roof assembly having a plurality of sensors mounted thereon. The roof assembly is mounted to a lower side of the vehicle roof at the interior of the vehicle; and a roof cover is mounted to the top of the vehicle roof to enclose the plurality of sensor devices and the opening. The plurality of sensors include a plurality of cameras having a field of view of the full width of the vehicle in at least the front of the vehicle, the height of the roof cover above the vehicle roof is a minimal height to accommodate the height of the cameras.

The present disclosure also relates to a method for mounting a roof apparatus for an autonomous hardtop vehicle in an opening for a sunroof. The method includes attaching one or more sensors to a radar reinforcement plate having a peripheral shape that matches the sunroof opening; attaching the radar reinforcement plate to a sunroof assembly; mounting the sunroof assembly to the underside of the roof of the hardtop vehicle; and mounting an aerodynamic cover to the top of the vehicle roof to cover the sunroof opening having the one or more sensors.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
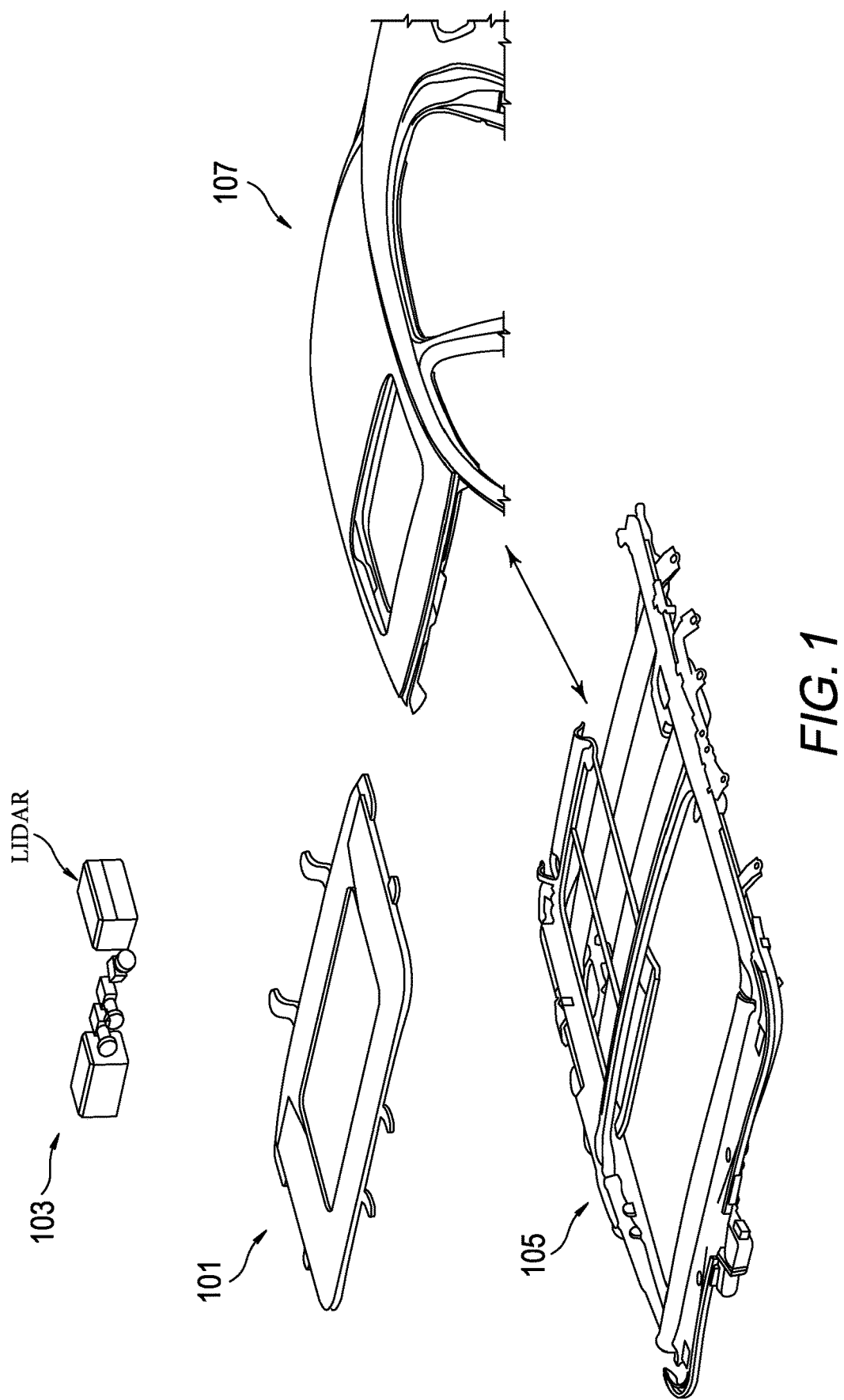
FIG. 1 is a breakout view of a roof assembly structure for a radar sensor array according to an exemplary aspect of the disclosure.

Referring now to the drawings, wherein like reference numerals designate identical or corresponding parts throughout several views, the following description relates to a roof assembly for an autonomous vehicle. Autonomous vehicles require several types of sensor devices, which together cause an aerodynamic drag on the vehicle. Disclosed are embodiments that provide a solution to these problems.

FIG. 1 is a breakout view of a roof assembly structure for a radar sensor array according to an exemplary aspect of the disclosure. The roof assembly structure is arranged for mounting into an existing opening in the roof of a vehicle. In some embodiments, the opening in the vehicle roof is a sunroof opening. The roof assembly structure may be a replacement for a sunroof. In some embodiments, the opening in the vehicle roof is a moonroof opening. The roof assembly structure may be a replacement for a moonroof. A sensor array 103 may be mounted to a radar reinforcement plate 101 and the reinforcement plate 101 is attached to a roof assembly 105.

The roof assembly 105 may be for a sunroof or moonroof. The roof assembly 105 may be a regular sunroof or moonroof assembly structure, with protruding structures 113 for accepting additional bolts. In an exemplary aspect, the bolt holes on each side of the roof assembly 105 match existing positions for mounting a sunroof assembly or a moonroof assembly.

In an exemplary aspect, the radar reinforcement plate 101 has protruding structures with holes 109 for accepting bolts on each side. Protruding structures 111 are provided on the front and rear of the radar reinforcement plate 101, each having holes to accept bolts for mounting the radar reinforcement plate 101 to the roof assembly 105. In an exemplary aspect, there are two bolt holes on each of the front and the back of the radar reinforcement plate 101, and three bolt holes on each side of the radar reinforcement plate 101. The radar reinforcement plate 101 may be a plate for supporting the sensors and take the shape of the opening for the sunroof or moonroof. The radar reinforcement plate 101 may also have an opening.

The sensor array 103 is intended for autonomous mode of driving the vehicle and may include several digital cameras and a LIDAR, each of which may be connected to a control unit in the trunk of the vehicle.

Once mounted, the entire structure may then be mounted as a single unit to the lower side of the vehicle roof 107, in the direction as that shown in FIG. 1.

Figure 2:
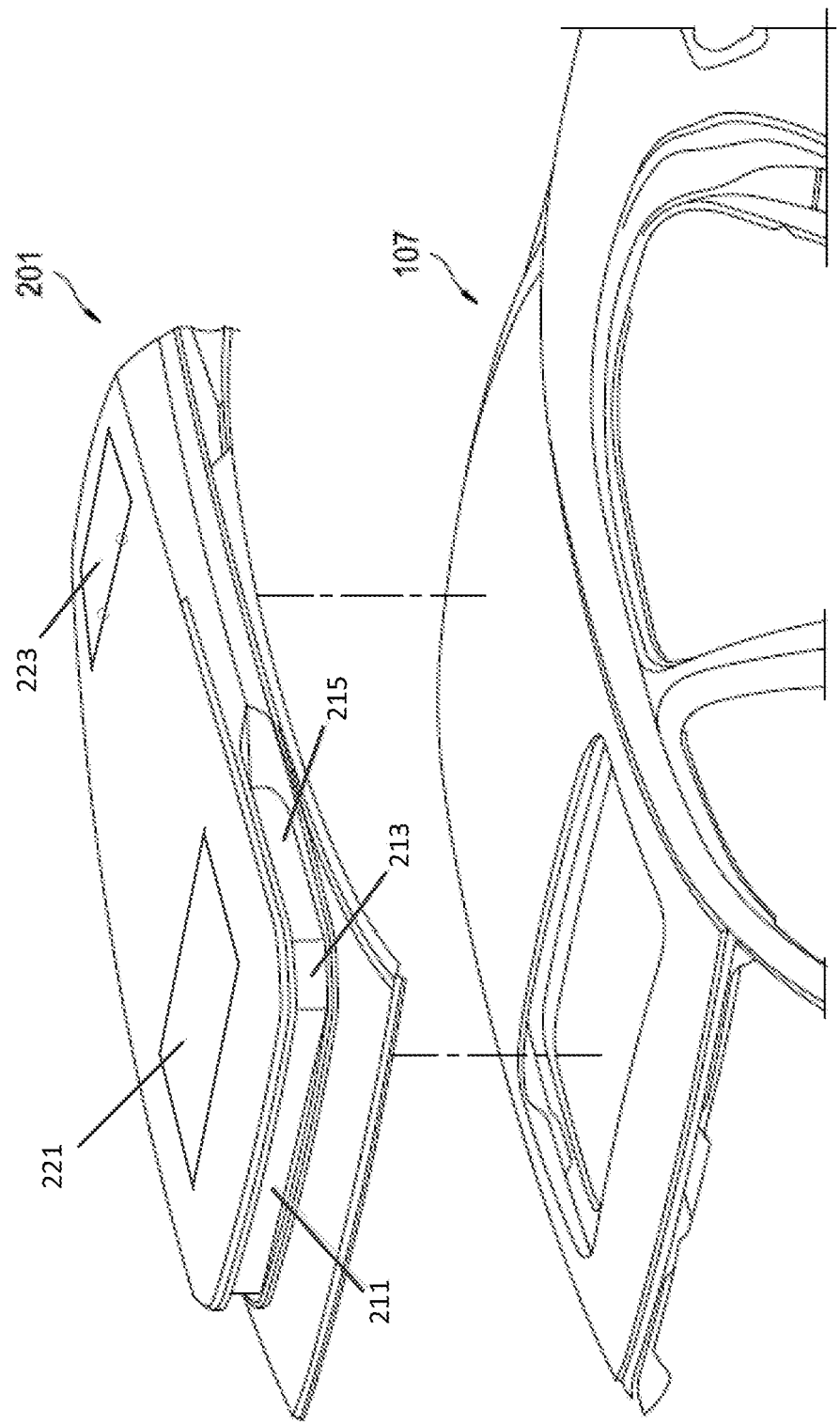
FIG. 2 is a view showing attachment of a roof cover according to one example.

FIG. 2 shows a roof cover 201 that may be mounted to the exterior of the vehicle on the roof. In some embodiments, the roof cover 201 extends substantially to the entire extent of the vehicle roof 107. In some embodiments, the roof cover may be a sufficient size to cover the sensor array and the opening in the vehicle roof 107.

The roof cover 201 includes one or more transparent windows to allow the sensors to have a view of the vehicle surroundings. In some embodiments, the roof cover 201 may include a front and a rear transparent window 211. In some embodiments, the roof cover 201 may include diagonal transparent windows 213, and side transparent windows 215. The transparent windows may be made of the same material as the vehicle windshield. In some embodiments, the transparent windows may be made of a material including glass, plastic, transparent resin, or combination thereof.

The roof cover 201 may include one or more access panels on the top side, to allow access to the sensors without having to remove the entire roof cover 201. In some embodiments, the roof cover 201 includes a front removable panel 221. Depending on the size of the roof cover 201, the roof cover 201 may include additional removable access panels, such as a rear removable access panel 223. Each removable panel may include a self-contained clamping mechanism, or may be held in place by a separate clamping mechanism, or bolted.

The height of the roof cover 201 is just sufficient for the highest sensor, which may be a LIDAR situated above the level of the digital cameras. The roof cover 201 may be made of the same material as the rest of the vehicle roof, which may include a composite material of metal and plastic, or sheet metal. In an exemplary aspect, the roof cover 201 may be made of a different material, such as a resin.

Figure 3:
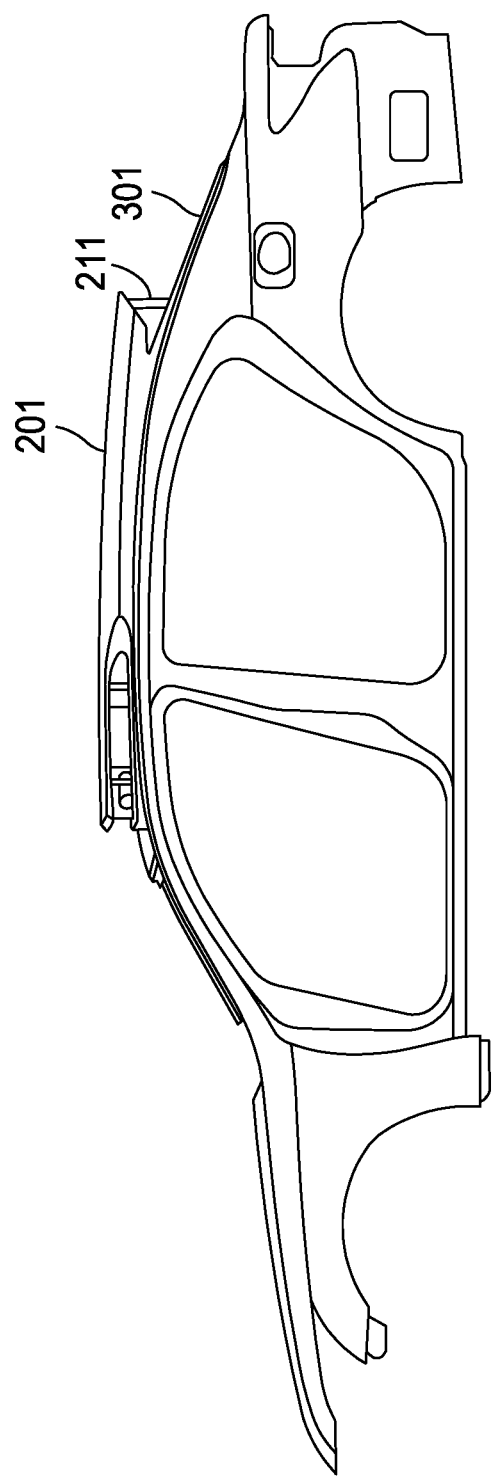
FIG. 3 is a side view of the roof cover and roof assembly structure according to one example.
Figure 4:
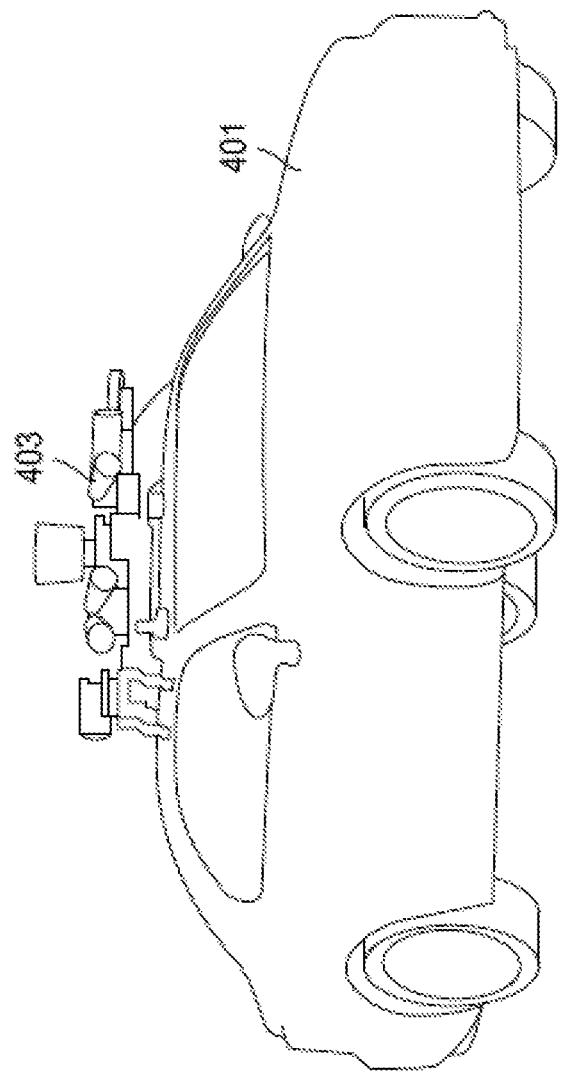
FIG. 4 shows a conventional structure for mounting sensors on a sedan-type vehicle.

As can be seen in FIG. 3, the roof cover 201 is aerodynamic. The view shown in FIG. 3 shows the arrangement of a glass or transparent plastic in the rear of the roof cover 201. In an exemplary aspect the roof cover 201 extends toward the rear of the roof of the vehicle to an extent that is sufficient for a rear camera to have a full range of view that the camera can accommodate. In an exemplary aspect, all sides along the periphery of the roof cover may be made of a transparent resin.

In one embodiment, the roof cover 201 is removable to provide access to the sensors for purposes of repair, adjustment and/or replacement. In an exemplary aspect, each of the sensors in the roof cover is adjustable, at least so that they may be rotated. In some aspects, the sensors may be mounted such that they may be raised or lowered within the roof cover. The reinforcement plate 101 to which sensors are mounted may be made of a resin or plastic, or metal, depending on the mounting structure.

The height of the roof cover above the roof in the raised position is minimized due to distributed arrangement of sensors. Cameras may be arranged close to a periphery of the roof cover where than can obtain a full range of view that is equivalent to their field of view.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A roof apparatus for an autonomous hardtop vehicle, the apparatus comprising:
    a vehicle roof having an opening;
    a roof assembly having a plurality of sensors mounted thereon, the roof assembly being mounted to a lower side of the vehicle roof at an interior of the vehicle;
    a roof panel that extends across and forms a top of the vehicle roof; and
    a roof cover mounted to the top of the vehicle roof to enclose the plurality of sensors and the opening,
    wherein the plurality of sensors include a plurality of cameras having a field of view of a full width of the vehicle in at least a front of the vehicle, and
    wherein the roof cover includes an arcuate front lip which closely matches a curvature of the vehicle roof.

2. The apparatus of claim 1, wherein the opening in the vehicle roof is a sunroof opening.

3. The apparatus of claim 1, wherein the opening in the vehicle roof is a moonroof opening.

4. The apparatus of claim 1, wherein a side of the roof cover arranged to face the front of the vehicle is of a transparent material,
    wherein a side of the roof cover arranged to face the rear of the vehicle is of a transparent material.

5. The apparatus of claim 1, wherein the plurality of sensors include a LIDAR.

6. The apparatus of claim 4, wherein the roof cover is made of the same material as a material of the vehicle roof, and the transparent material is a same material as the vehicle windshield.

7. The apparatus of claim 4, wherein the transparent material includes one or more of glass, plastic, and a transparent resin.

8. The apparatus of claim 1, wherein peripheral edges of the roof cover is made of a transparent resin sufficient to allow a signal transmitted from the sensors to pass through substantially unobstructed.

9. A method for mounting a roof apparatus for an autonomous hardtop vehicle in an opening for a sunroof, the method comprising:
    attaching one or more sensors to a radar reinforcement plate having a peripheral shape that matches the sunroof opening;
    attaching the radar reinforcement plate to a sunroof assembly;
    mounting the sunroof assembly to an underside of the roof of the hardtop vehicle; and
    mounting an aerodynamic cover to a top of a vehicle roof panel to enclose the sunroof opening and the one or more sensors,
    wherein the aerodynamic cover includes an arcuate front lip which closely matches and engages with a curvature of a front of the vehicle roof.

10. The method of claim 9, wherein the radar reinforcement plate is attached to the sunroof assembly and the sunroof assembly is attached to the underside of the roof of the hardtop vehicle at a position for mounting a sunroof.

11. A roof apparatus for an autonomous hardtop vehicle, the apparatus comprising:
    a vehicle roof having an opening;
    a roof assembly having a plurality of sensors mounted thereon, the roof assembly being mounted to a lower side of the vehicle roof at an interior of the vehicle;

a roof panel that extends across and forms the top of the vehicle roof; and a roof cover mounted to the top of the vehicle roof to enclose the plurality of sensors and the opening, wherein the plurality of sensors include a plurality of cameras having a field of view of a full width of the vehicle in at least a front of the vehicle, and wherein the roof cover includes a transition at a rear of the roof cover, and wherein the transition closely matches and engages with a curvature of a rear window of the vehicle.

12. The method of claim 9, wherein the aerodynamic cover includes a transition at a rear of the aerodynamic cover, and wherein the transition closely matches a curvature of a rear of the vehicle.

13. The apparatus of claim 1, wherein the arcuate front lip closely matches and engages with a curvature of a front of the vehicle roof.

14. The apparatus of claim 1, wherein the roof cover includes a transition at a rear of the roof cover, and wherein the transition closely matches a curvature of a rear the vehicle.

* * * * *